US012451940B2

(12) United States Patent
Bamford et al.

(10) Patent No.: US 12,451,940 B2
(45) Date of Patent: Oct. 21, 2025

(54) LUNEBURG LENS-BASED SYSTEM FOR MASSIVE MIMO

(71) Applicant: John Mezzalingua Associates, LLC, Liverpool, NY (US)

(72) Inventors: Lance Bamford, Pittsford, NY (US); Michael Rody Tierney, Jr., Skaneateles, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 72 days.

(21) Appl. No.: 17/945,540

(22) Filed: Sep. 15, 2022

(65) Prior Publication Data

US 2023/0099438 A1    Mar. 30, 2023

Related U.S. Application Data

(60) Provisional application No. 63/328,895, filed on Apr. 8, 2022, provisional application No. 63/247,952, filed on Sep. 24, 2021.

(51) Int. Cl.
*H04B 7/06*      (2006.01)
*H01Q 15/08*    (2006.01)
(Continued)

(52) U.S. Cl.
CPC .......... *H04B 7/0617* (2013.01); *H01Q 15/08* (2013.01); *H01Q 21/24* (2013.01); *H04B 7/0413* (2013.01);
(Continued)

(58) Field of Classification Search
CPC .. H04B 7/0617; H04B 7/0413; H04B 7/0814; H04B 17/318; H04B 7/0691;
(Continued)

(56) References Cited

U.S. PATENT DOCUMENTS 10,256,551 B2    4/2019    Shehan
11,101,872 B2    8/2021    Ho
(Continued)

FOREIGN PATENT DOCUMENTS

WO    2020/190331 A1    9/2020
WO    2021/021895 A1    2/2021

OTHER PUBLICATIONS

International Search report and Written Opinion issued for Application No. PCT/US2022/076457, dated Jan. 4, 2023.
(Continued)

*Primary Examiner* — Sung S Ahn
(74) *Attorney, Agent, or Firm* — Meunier Carlin & Curfman LLC

(57) ABSTRACT

Disclosed is a system for performing Massive MIMO or Multi-User MIMO using a gradient index sphere (such as a Luneburg Lens). The gradient index sphere may have a plurality of radiators disposed along its outer surface such that each radiator radiates inward toward the center of the sphere so that the sphere focuses the energy from each radiator to form a tight beam. This provides for improved uplink gain for detecting and locating a mobile device within range of the system, and it enables high performance with reduced signal processing required for array-based beamforming.

12 Claims, 12 Drawing Sheets

(51) Int. Cl.
*H01Q 21/24* (2006.01)
*H04B 7/0413* (2017.01)
*H04B 7/08* (2006.01)
*H04B 17/318* (2015.01)

(52) U.S. Cl.
CPC ......... *H04B 7/0814* (2013.01); *H04B 17/318* (2015.01)

(58) Field of Classification Search
CPC ...... H04B 7/0695; H04B 7/088; H01Q 15/08; H01Q 21/24; H01Q 1/246; H01Q 3/245; H01Q 3/2658; H01Q 15/02; H01Q 19/062; H01Q 25/007
See application file for complete search history.

(56) References Cited

U.S. PATENT DOCUMENTS

| | | |
|---|---|---|
| 2006/0028386 A1 | 2/2006 | Ebling et al. |
| 2010/0079347 A1 | 4/2010 | Hayes et al. |
| 2017/0324171 A1 | 11/2017 | Shehan |
| 2019/0037416 A1* | 1/2019 | Linehan ............... H01Q 3/2658 |
| 2019/0181926 A1 | 6/2019 | Liang et al. |
| 2020/0119776 A1 | 4/2020 | Lorca Hernando et al. |
| 2020/0127710 A1 | 4/2020 | Athley et al. |
| 2020/0144719 A1 | 5/2020 | Scarborough et al. |
| 2022/0070834 A1* | 3/2022 | Raghavan ............. H04B 7/086 |
| 2022/0294121 A1* | 9/2022 | Xin ........................ H01Q 19/06 |

OTHER PUBLICATIONS

Extended European Search Report, dated Jul. 1, 2025, received in connection with corresponding EP Patent Application No. 22873781.3.

* cited by examiner

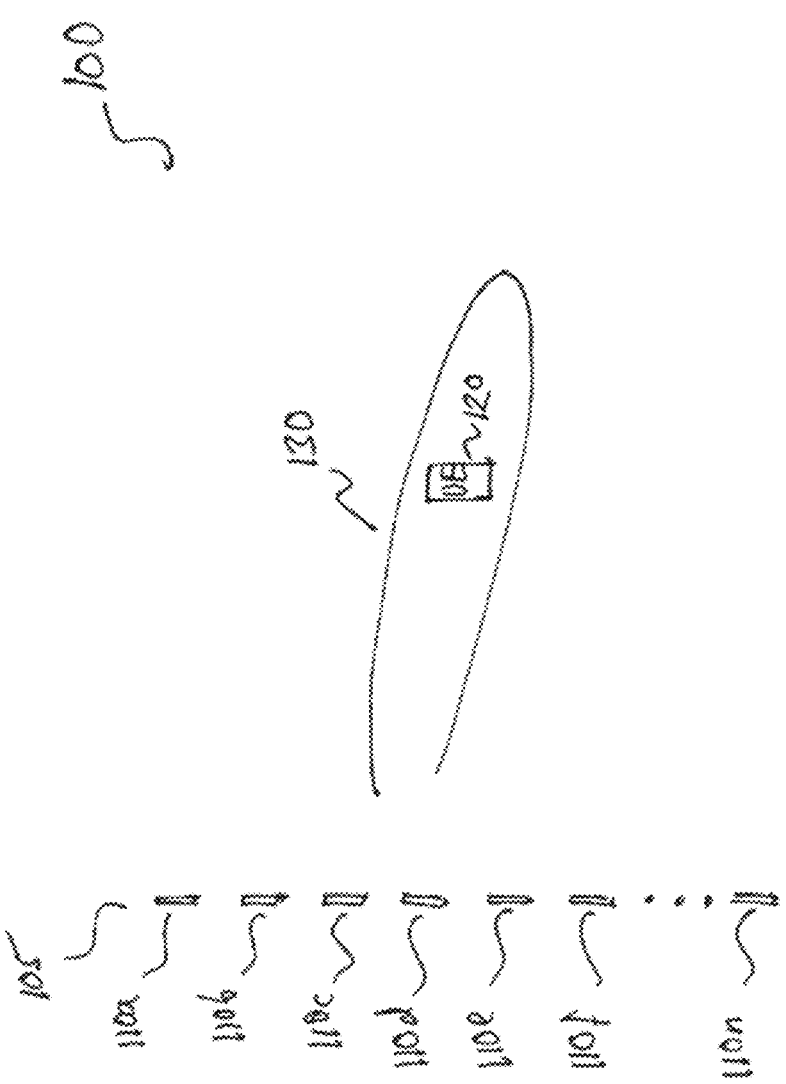

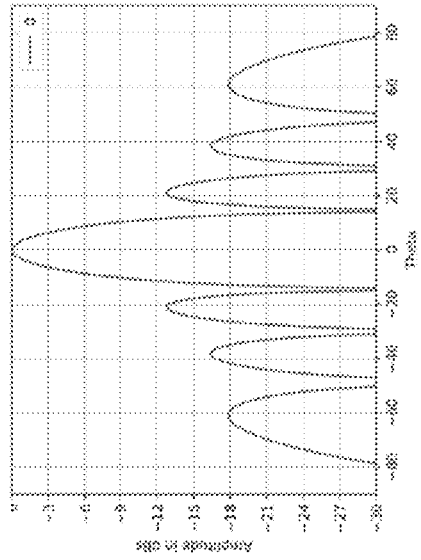
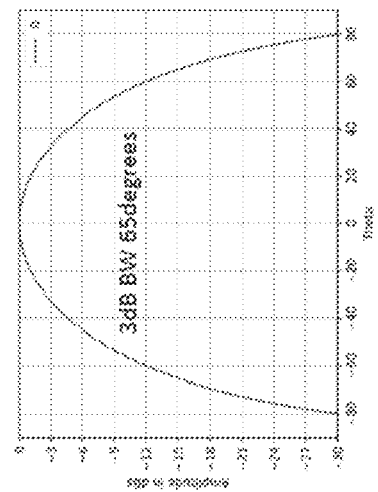
FIG. 8

LUNEBURG LENS-BASED SYSTEM FOR MASSIVE MIMO

CROSS REFERENCE TO RELATED APPLICATIONS

This application is a non-Provisional of and claims priority benefit to U.S. Provisional Patent Application No. 63/328,895, filed Apr. 8, 2022, and U.S. Provisional Patent Application No. 63/247,952, filed Sep. 24, 2021, which applications are hereby incorporated by this reference in their entireties.

BACKGROUND

Field of the Invention

The present invention relates to wireless communications, and more particularly, to systems for performing Massive MIMO (Multiple Input Multiple Output) in cellular communications.

Related Art

In order to increase capacity of modern cellular communications systems, techniques and systems have been developed to reuse spectrum resources among multiple mobile devices or UEs (User Equipment). This is done by use of phased array antennas whereby two different UEs (for example) that have sufficient angular separation may each be allocated a single beam. If these beams do not overlap where they engage with their respective UEs, each may transmit and receive using the same spectrum resources. There are two established methods for doing this: Massive MIMO, and Multi-User MIMO.

FIG. 1A illustrates a conventional Massive MIMO scenario 100. Conventional Massive MIMO scenario 100 involves an antenna array 105 having a plurality of antenna elements 110a-n. Each antenna element 110a-n has a respective individual gain pattern 115a-n. Within range of antenna array 105 is a UE 120, which is transmitting a pilot tone 125 that is detected by each of the antenna elements 110a-n. Each RF receiver (not shown) coupled to a corresponding antenna element 110a-n detects the pilot tone 125 with a corresponding amplitude and phase $a_x \angle \theta_x$. This occurs for each element a-n. According to conventional beamforming techniques, a processor (not shown) calculates the complex conjugates of the set of amplitudes and phases $a_{a-n} \angle \theta_{a-n}$ and applies those amplitude and phase weights to elements 110a-n to form a beam directed toward UE 120.

FIG. 1B illustrates a resulting beamformed beam 130, which is formed by the superposition of each of the individual gain patterns 115a-n that have had their respective amplitudes and phases altered according to the calculated weights based on the complex conjugates of the received amplitude and phase $a_{a-n} \angle \theta_{a-n}$ of pilot tone 125.

It will be understood that this process may be repeated with each additional UE (not shown) within range of antenna array 105. In this case, each UE may have a dedicated beam. Accordingly, the same spectral resources may be used for each beam for communicating with each UE, enhancing the capacity of the system, provided that the corresponding beams do not overlap to an extent to create excessive noise and therefore limiting the capacity as governed by the Shannon-Hartley Theorem.

FIG. 2 illustrates a conventional Multi-User MIMO scenario 200. As illustrated, antenna array 105 may be identical to that of scenario 100. According to scenario 200, predetermined amplitude and phase weights are applied to a plurality of signals applied to each of the elements 100a-n. This results in a plurality of individual beams 230-236. Given that each beam 230-236 is the result of a particular pattern of amplitude and phase weights $a_{a \ldots n} \angle \theta_{a \ldots n}$ for the corresponding antenna elements 110a-n. Accordingly, there need not be a correlation between the number of beams 230-236 and the number of elements 110a-n.

According to conventional Multi-User MIMO procedures (3GPP conventional Beamforming code book 1) under scenario 200, UE 120 measures the strength of each beam 230-236 that it receives and determines which beam has the strongest reception. In the illustrated example, beam 233 is the strongest, although UE 120 may also detect and measure beams 232 and 234. Given this information, UE 120 transmits a response to the base station (not shown) connected to antenna array 105 that beam 233 is the strongest. Accordingly, the base station performs necessary processing to only transmit to UE 120 on beam 233. It will be understood that additional UEs (not shown) within range of antenna array 105 may transmit information to the base station indicating its corresponding strongest received beam among beams 230-236.

There are disadvantages to the conventional approaches described above. For example, in scenario 100, each antenna element 100a-n has a limited individual gain 115a-n. Accordingly, until a beamformed beam 130 is created based on the complex conjugates of the measured amplitudes and phases of each antenna element 110a-n, the pilot tone 125 received by each antenna element 110a-n will be faint towards the cell edge, i.e., toward the edge of antenna 105 signal coverage. This may limit the performance and range of antenna array 105 under conventional Massive MIMO techniques for uplink transmission. Further, in scenario 200, under conventional Multi-User MIMO, there is a limited number of precoded beams 230-236, each of them having fixed gain patterns. Accordingly, there is a limit to the extent to which spectral resources may be reused among different UEs; and if a UE is located between any given pair of fixed pre-coded beams 230-236, then not only may there be interference between adjacent beams, but the quality of the signal received by that UE will be diminished for being at the periphery of whichever beam is used for communication. Additionally, in both scenarios 100 and 200, antenna array 105 has performance limitations because beams that are increasingly off-axis suffer from a distortion of their beam patterns such that the beam becomes "squashed": wider with notably reduced gain at wide scan angle, with more energy becoming relegated to the beam's sidelobes further reducing directivity and hence peak gain. Increased sidelobe levels place noise into adjacent beams thereby limiting throughput capacity within that adjacent beam. Accordingly, referring to FIG. 2, beams 230 and 236, considered as maximum scan angle beams, will have notably lower gain profile than that of axial beam 232. Further, the gain reduction at extreme scan angles, e.g., beams 230, 231, 235 and 236, is affected by single element pattern gain roll off as a function of angle and the limited number of array elements, typically eight in the azimuth plane. The number of elements is typically limited due to antenna size, cost and weight constraints, giving rise to a performance compromise.

Planar antenna array pattern distortion at extreme scan angles occurs due to factors including the following: first, as illustrated in FIG. 7, single element gain drops off at extreme scan angles; and second, the 'Array Factor' pattern distortion, shown in FIG. 9 at extreme scan angles, is a product of limiting the number of antenna array elements. The single element pattern and array factor components are multiplied together, as shown in FIG. 8, to give an actual antenna array pattern.

Note, pattern distortion is quantified as the deterioration of typical key parameters such as gain, beamwidths, sidelobes, Front to Back Ratios and cross polarization signal strength. In addition, it is recognized that the single element pattern varies across the planar array face due to mutual coupling effects and therefore using a single element pattern to represent all is a simplification, one which is adequate for this discussion.

FIG. 3 illustrates an exemplary deployment 300 of cellular antennas 305. Depending on the frequency for which the deployment 300 was designed, the gain patterns and coverage areas 310 of each cellular antenna 305 extend to where they slightly overlap. This provides contiguous coverage and opportunities for UEs (not shown) to engage with two cellular antennas for the purpose of handoff. Under conventional deployments, such as deployment 300, the physical spacing of cellular antennas 305 may be designed for conventional cellular frequencies, such as 1900 MHz. However, with the advent of 5G and CBRS (Citizens Broadband Radio Service), higher frequencies are used, on the order of 3.5 GHz. Given that higher frequencies generally have shorter propagation distances, deploying a conventional antenna array 105 intended for 3.5 GHz with conventional Multi-User MIMO and Massive MIMO techniques may result in large gaps in coverage between cellular antennas 305. This problem becomes exacerbated by the weak individual gain 115a-n of antenna elements 110a-n of a deployment of conventional antenna arrays 105. Relying on traditional antenna arrays 105 may require deploying additional antenna arrays 105 to fill the gaps in coverage between cellular antennas 305, incurring considerable expense.

Accordingly, what it needed is an improved antenna and system for performing Massive MIMO that does not incur the disadvantages of the conventional approaches discussed above.

SUMMARY OF THE DISCLOSURE

An aspect of the present disclosure involves a method for establishing a link between a base station and a UE (User Equipment), the base station having a plurality of radiators disposed on an outer surface of a gradient index sphere, each radiator configured to generate a unique beam having a corresponding unique boresight. The method comprises simultaneously transmitting a downlink signal on each beam; simultaneously receiving, by a subset of radiators, an uplink signal transmitted by the UE; and implementing beamforming to generate a UE-specific beam using only the subset of radiators.

Another aspect of the present disclosure involves a method for establishing a link between a base station and a UE (User Equipment), the base station having a plurality of radiators disposed on an outer surface of a gradient index sphere, each radiator configured to generate a unique beam having a corresponding unique boresight. The method comprises simultaneously transmitting a downlink signal on each beam; simultaneously receiving, by a subset of radiators, an uplink signal transmitted by the UE; measuring a signal strength corresponding to each received uplink signal; determining if the measured signal strength of one of the received uplink signals has a sufficient strength; and depending on the determining, designating a sole radiator for communication with the UE, the sole radiator corresponding to the uplink signal having a sufficient strength.

Another aspect of the present disclosure involves a method for establishing a link between a base station and a UE (User Equipment), the base station having a plurality of radiators disposed on an outer surface of a gradient index sphere, each radiator configured to generate a unique beam having a corresponding unique boresight. The method comprises simultaneously transmitting a downlink signal on each beam; simultaneously receiving, by a subset of radiators, an uplink signal transmitted by the UE; measuring a signal strength corresponding to each received uplink signal; depending on the determining, designating a second subset of radiators based on their measured signal strength; and implementing beamforming to generate a UE-specific beam using only the second subset of radiators.

Another aspect of the present disclosure involves an antenna for use in a Massive MIMO (Multiple Input Multiple Output). The antenna comprises a gradient index sphere having a diameter; and a plurality of radiators disposed on the gradient index sphere along an azimuthal plane and at an angular spacing, each of the radiators having a corresponding beamwidth, wherein the diameter and the angular spacing are configured whereby the beamwidth of each of the plurality of radiators is substantially uniform and whereby the beamwidth is substantially equal to the angular spacing.

BRIEF DESCRIPTION OF THE DRAWINGS

FIG. 1B illustrates the conventional Massive MIMO deployment of FIG. 1A, showing a beamformed beam created by an antenna array.

FIG. 8 illustrates the fall 'fall off' gain at extreme angles for multiple conventional array elements combined to form an array factor.

DESCRIPTION OF EXEMPLARY EMBODIMENTS

Figure 4:
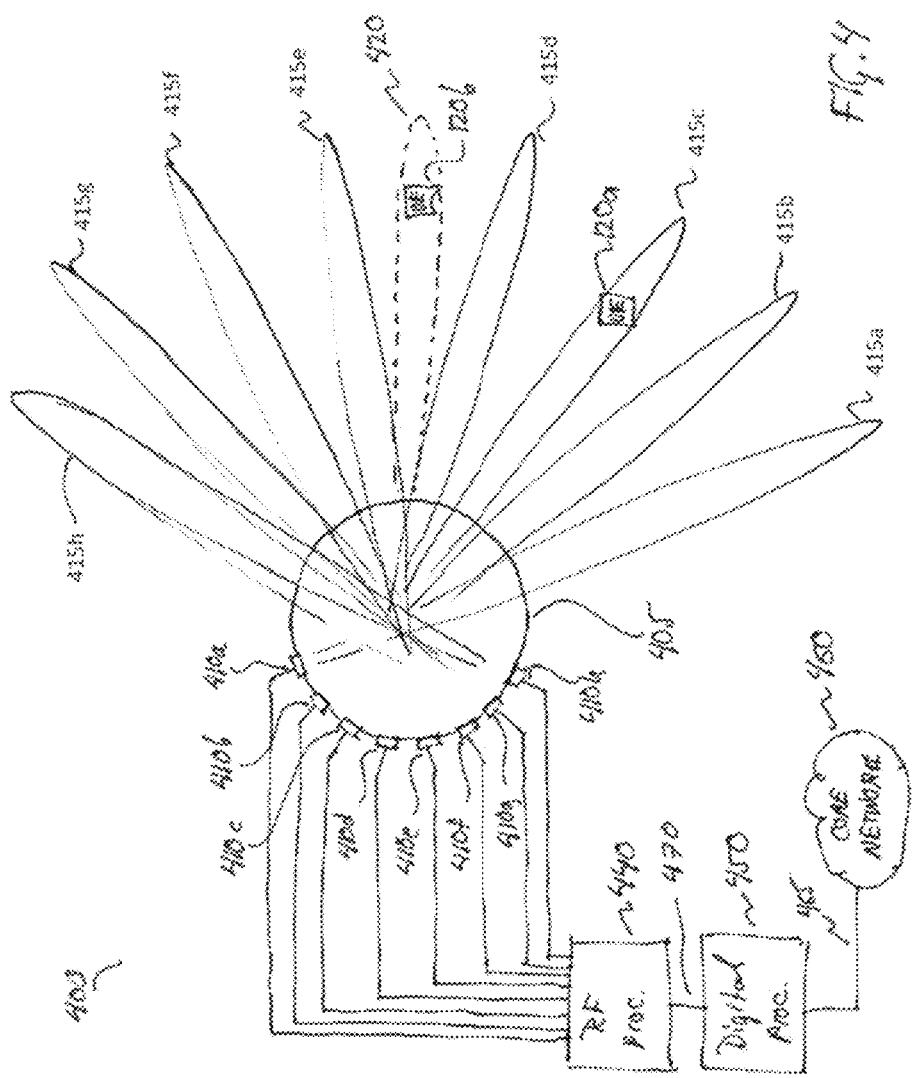
FIG. 4 illustrates an exemplary Luneberg lens-based system for performing Massive MIMO according to the disclosure.

FIG. 4 illustrates an exemplary system 400, which includes a gradient index sphere (e.g., Luneburg lens) 405, on which are disposed a plurality of radiators 410*a-h*. Each radiator 410*a-h* is coupled to an RF (Radio Frequency) processor 440, which may have an RF processing channel for each radiator 410*a-h*. Each RF processor 440 may have an individual channel for each radiator 410*a-h*, whereby each channel may include filters, power amplifiers (for transmitting downlink signals), low noise amplifiers (for receiving uplink signals), up/down frequency conversion circuitry, and A/D (analog-to-digital) and D/A (digital-to-analog) converters. The A/D converters convert the analog uplink signals into digital signals for transmission to a digital processor 450; and the D/A converters convert downlink digital signals received from the digital processor 450. Digital processor 450 may have one or more processors that implement one or more communication protocol stacks and may in turn be coupled to one or more core networks 460 via a backhaul connection 465. Different implementations of digital processor 450 and RF processor 440 are possible and within the scope of the disclosure. For example, digital processor 450 may be an LTE eNodeB and RF processor 440 may be a radio remote unit coupled to it over a fronthaul connection 470. Alternatively, digital processor 450 may be a 5G gNodeB and the RF processor 440 may be a radio remote unit coupled to it over an eCPRI or 7.2× connection 470; or digital processor 450 may be a 5G gNodeB Central Unit (CU) and RF processor may include a 5G gNodeB Distributed Unit (DU) coupled to the CU over an F1 connection 470. It will be understood that such variations are possible and within the scope of the disclosure.

For background, a Luneburg lens (e.g., gradient index sphere 405) is a sphere having a concentrically-graded refractive index. Gradient index sphere 405 may have a continuous grading of refractive index from the sphere's center (max. refractive index) to its outer surface (min. refractive index). In an exemplary embodiment, the refractive index at the center of the sphere may be 2.0, and the index at the sphere surface may be 1.19, inclusive of a protective thin shell of dielectric material for physical protection of the lens. It will be understood that variations to these max and min indices are possible, and within the scope of the disclosure. Gradient index sphere 405 may have a step gradient in refractive index. A Luneburg lens (such as gradient index sphere 405) serves to substantially focus and planarize the RF wavefront emitted by each radiator 410*a-h* in response to each radiator 410*a-h* radiating inward toward the spherical center of the gradient index sphere 405. As such, each radiator 410*a-h* emits a beam from the gradient index sphere 405 having a boresight defined by the orientation of the radiator relative to the center of the sphere. As a receiver, gradient index sphere 405 focuses a received substantially planar wavefront that impinges onto it into an aperture defined by a given radiator 410*a-h*, substantially in reverse of the focusing and planarizing done to transmitted energy and having the same boresight. Further discussion of Luneburg lens configurations and variations may be found in co-owned PCT application PCT/US2019/052930 (publication number WO2020/190331) SPHERICAL LUNEBURG LENS-ENHANCED COMPACT MULTI-BEAM ANTENNA, which is incorporated by reference is if fully disclosed herein.

As illustrated, each radiator 410*a-h* may independently transmit a dedicated signal that the gradient index sphere 405 focuses into a corresponding beam 415*a-h*. As illustrated, each radiator 410*a-h* has a distinct beam 415*a-h* having a unique boresight. Although each beam 415*a-h* is illustrated as having a beamwidth that is narrower that the diameter of the gradient index sphere 405, it will be understood that this is done for the convenience of illustration, and that the width of the beam 415*a-h* may encompass the diameter of the gradient index sphere 405 as the energy is focused. Further, the frequency at which a given radiator 410*a-h* radiates and the diameter of gradient index sphere 405 may dictate the angle of divergence of the corresponding beam 415*a-h* as it leaves the surface of the gradient index sphere 405. As illustrated, there may be substantially designed consistent overlap between adjacent beams 415*a-h* after a reasonably short propagation distance from gradient index sphere 405. As well as consistent beam overlap, sidelobes may be consistent between beams with minimum change for each beam scan. This minimizes their effect of placing interference into adjacent beams even under large scan angle conditions, thereby enabling consistent channel hardening across the scanned beams within system 400. Each beam 415*a-h* may carry an independent signal to the UEs within its corresponding gain pattern without interference from adjacent beams. In the illustrated example, UE 120*a*, which is within the coverage of beam 415*c*, may communicate with system 400 independently and without interference from signals propagating in beams 415*b* and 415*d*.

Figure 1A:
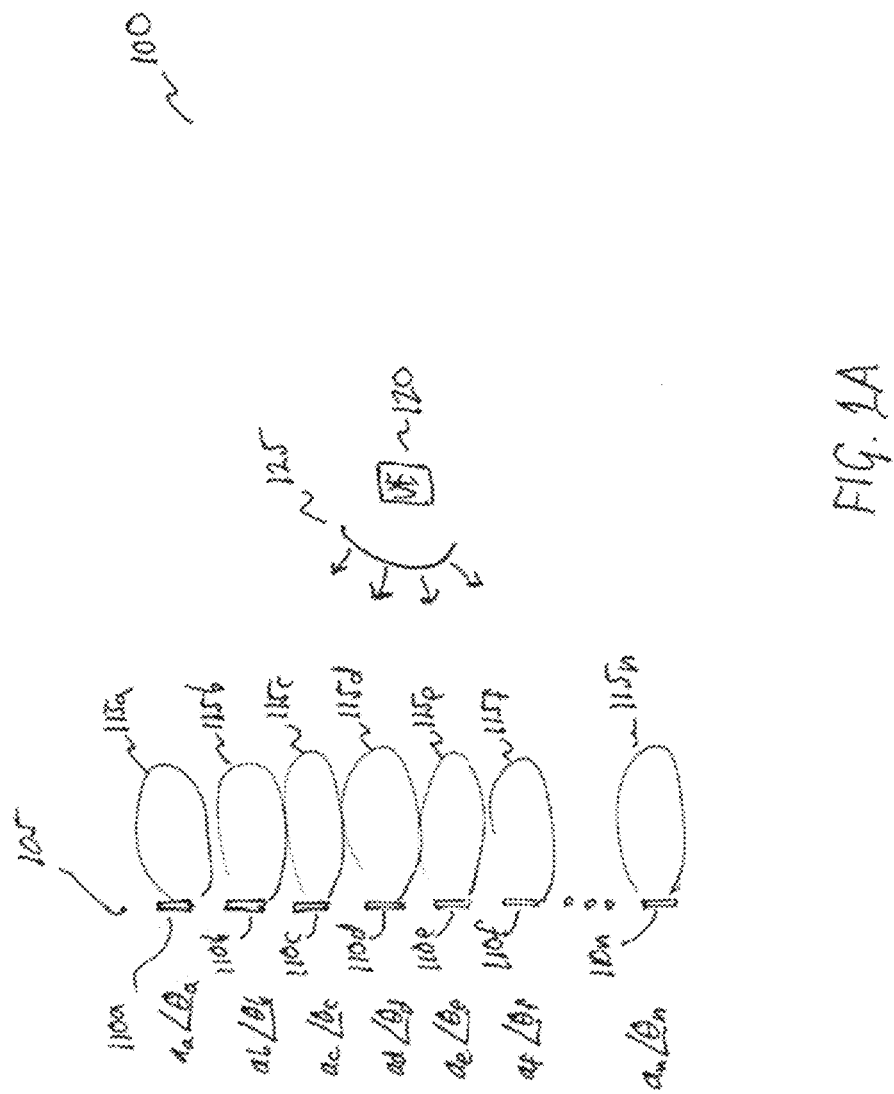
FIG. 1A illustrates a conventional Massive MIMO deployment, showing individual antenna element gains.

Depending on the angular spacing of radiators 410*a-h* on gradient index sphere 405, there may be gaps between adjacent beams 410*a-h*. In the example illustrated in FIG. 4, UE 120*b* is located in a coverage gap between beams 415*d* and 415*e*. In this case, two or more beams may be combined using known beamforming techniques to create a targeted beam 420. In this example, UE 120*b* may transmit a pilot tone (not shown) like that described above with regard to FIG. 1A, and radiators (e.g., 410*d/e*, or 410*c/d/e/f*) may receive the pilot tone with individual signal amplitudes and phases. These received signals may be coupled to RF processor 440 and may subsequently be sent to digital processor 450. Depending on whether beamforming processing is performed in the analog or digital domain, RF processor 440 or digital processor 450 may compute the values of the received signals and use computed weights for applying to the signal to be transmitted by radiators 410*d-e* or 410*c-f*. Depending on the strength of the pilot tone received by radiators 410*a-h*, it may be that only a few radiators 410 are required for communicating with UE 120*b*. In one example, forming a targeted beam 420 may only require weighted signal contributions from a subset of radiators, such as radiators 410*d* and 410*e*, or alternatively from radiators 410*c,d,e,f*.

Figure 2:
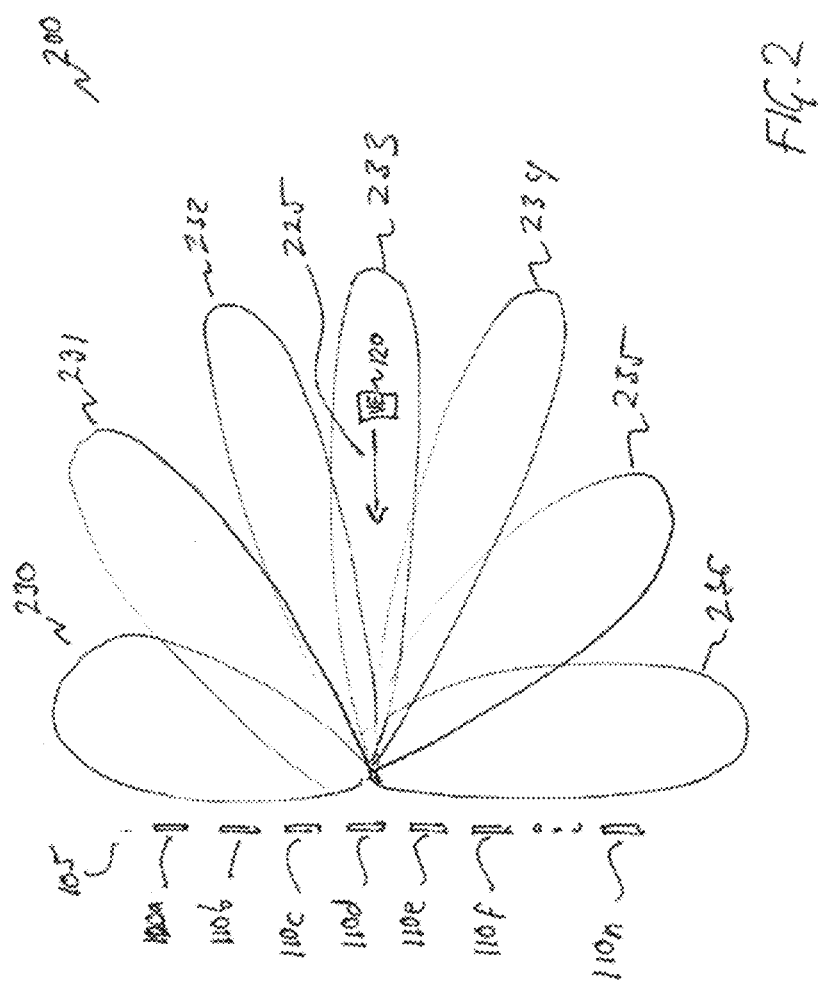
FIG. 2 illustrates a conventional Multi-User MIMO deployment.
Figure 3:
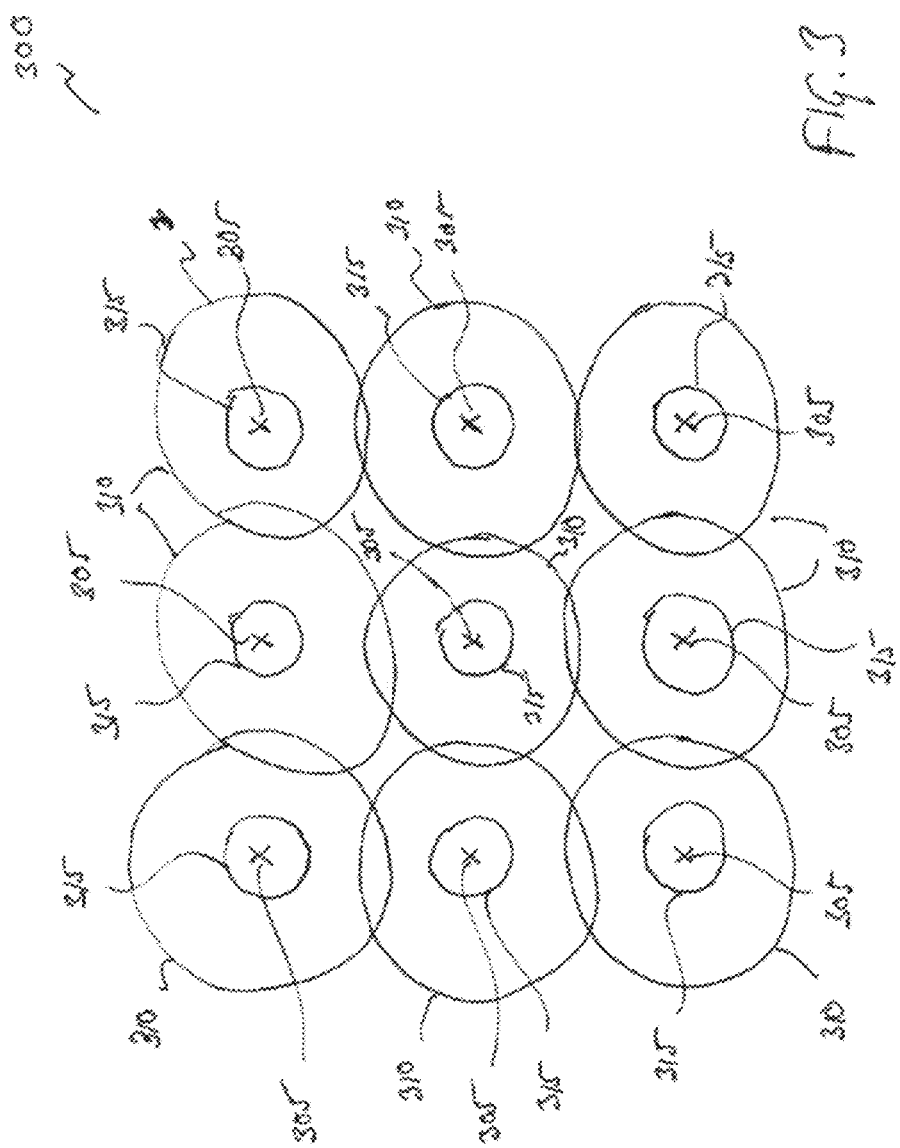
FIG. 3 illustrates a deployment of cellular antennas, showing expected coverage areas at both 1900 MHz and 3.5 GHz.

Variations of gradient index sphere 405 may have different radii as well as a different number of radiators 410 and angular spacing. Further, gradient index sphere 405 may have multiple rings of radiators 410 for azimuth and elevation beam differentiation. Fewer radiators 410 may be used with more inter-beam beamforming. Alternatively, more radiators 410 may reduce the angular spacing of the boresights of beams 415*a-h* and thus reduce or eliminate any gaps in coverage between adjacent beams. This may obviate the need for inter-beam beamforming, in which there is sufficient coverage to operate like a Multi-user MIMO, similar to that described above with reference to FIG. 2. A smaller gradient index sphere 405 may be used in locations having space constraints, such as in urban environments or indoor deployments. In this case, more beamforming may be relied upon (still using only a subset of the radiators) to compensate for reduced sphere-based beam focusing. It will be understood that such variations are possible and within the scope of the disclosure.

Figure 5:
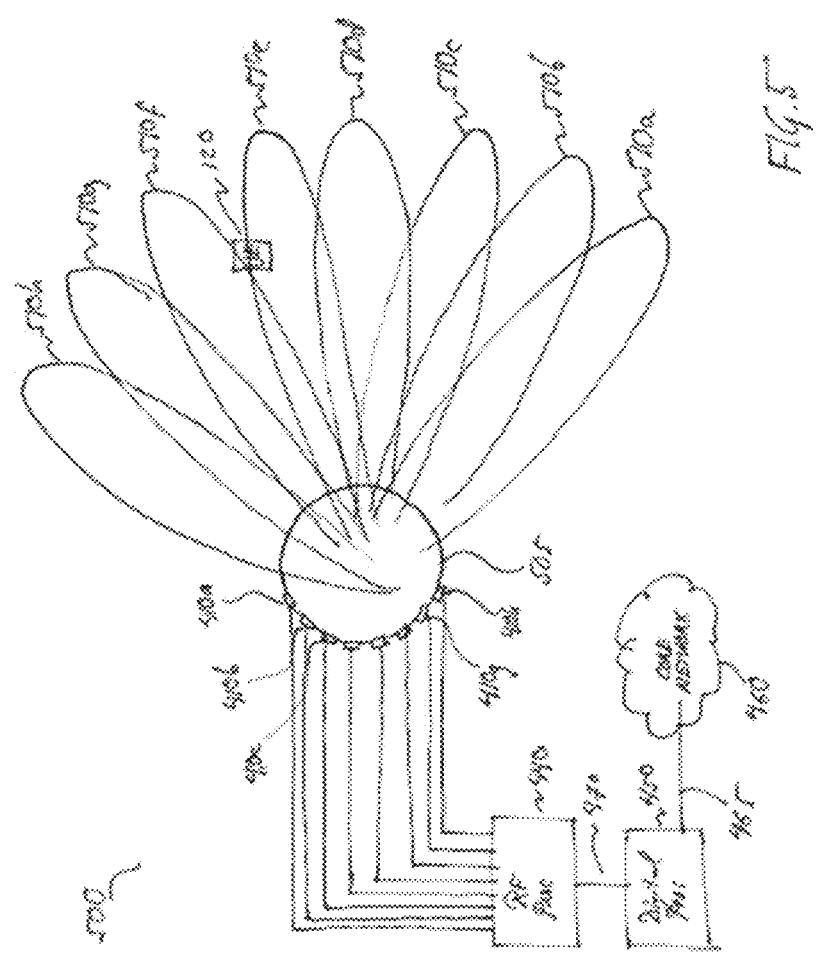
FIG. 5 illustrates a variation of the exemplary Luneberg lens-based system for performing Massive MIMO according to the disclosure, in which the beams have greater overlap.

FIG. 5 illustrates another exemplary Luneberg lens-based system 500 for performing Massive MIMO according to the disclosure, in which the beams have greater overlap. This may be done in different ways. For example, gradient index sphere 505 may have a smaller diameter than that of sphere 405. which would increase the width of each beam 415a-h; or the angular spacing between radiators 410a-h may be reduced, which would bring adjacent beams 510a-h closer together; or a combination of these two approaches may be used. With the gradient index sphere 505 being smaller, each resulting beam 510a-h may be broader in gain pattern, leading to greater beam overlap, but also providing coverage such that a given UE 120 may have a sufficiently strong RF link to a given radiator (410e or 410f, in this example) such that beamforming might not be necessary. In this case, the UE may operate in Multi-user MIMO mode, providing a beam index (not shown) to digital processor 450, whereby UE 120 may be solely serviced by one radiator (410e or 410f).

Examples of radiators 410a-h may include quad ridge horns, flared-notch radiators, Vivaldi radiators, log-periodic radiators, dipole or patch radiators. Each illustrated radiator 410a-h may be two collocated radiators that operate in orthogonal polarizations, such as +/−45 degrees. In this case, each beam 410a-h may be two concentric beams, each at a different polarization. It will be understood that such variations are possible and within the scope of the disclosure.

Figure 6:
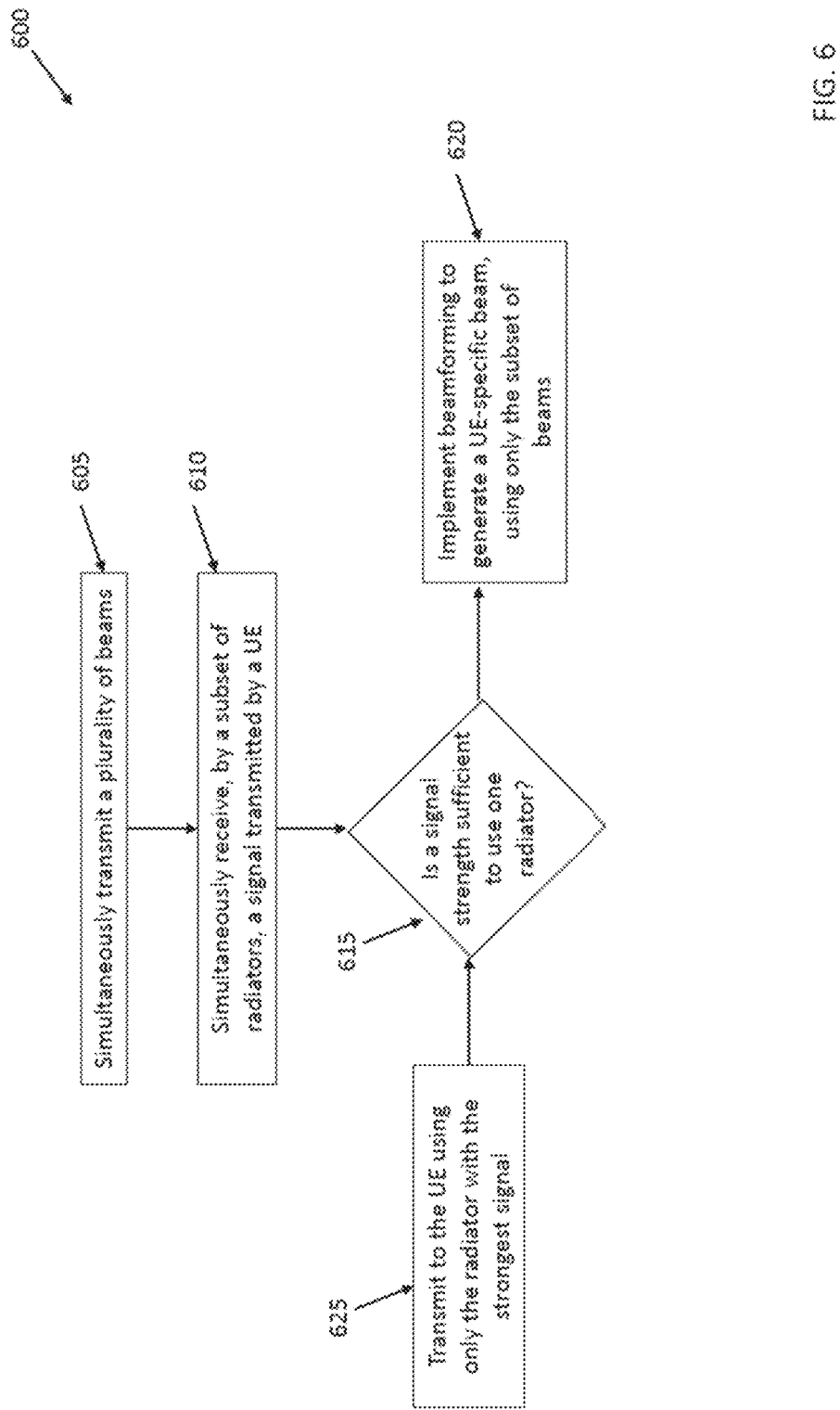
FIG. 6 illustrates an exemplary process for performing MIMO according to the disclosure.
Figure 7:
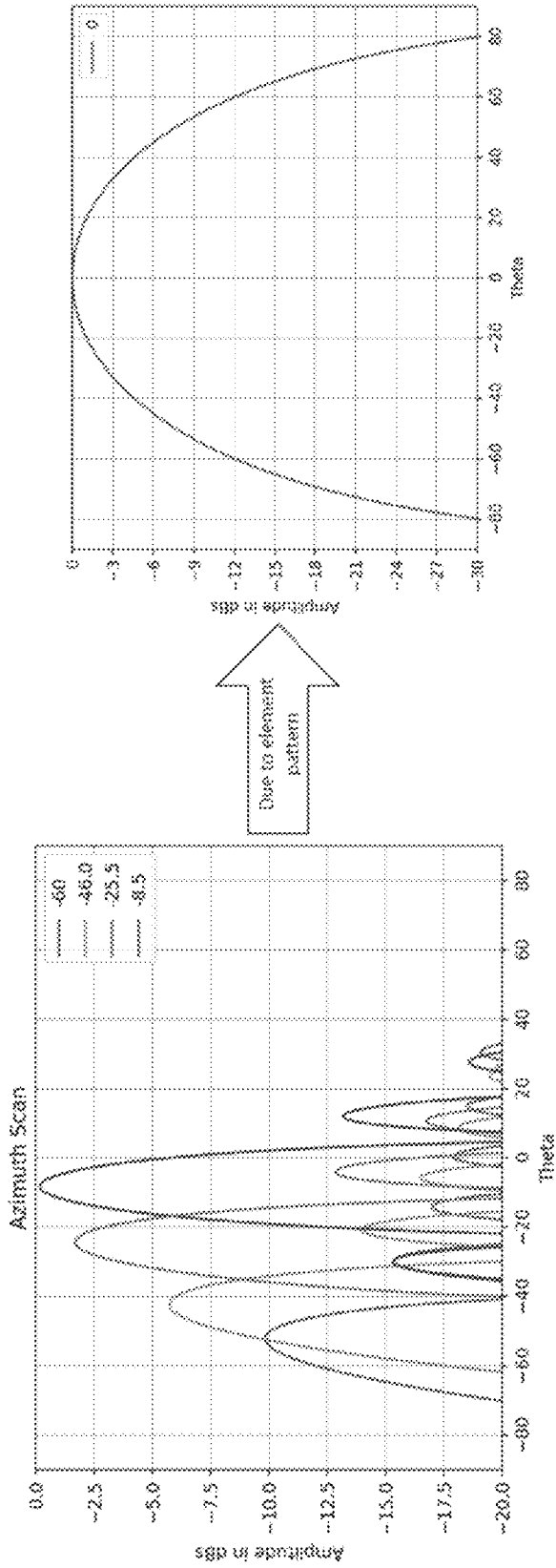
FIG. 7 illustrates a 'fall off' of gain at extreme angles for a single conventional array element.
Figure 9:
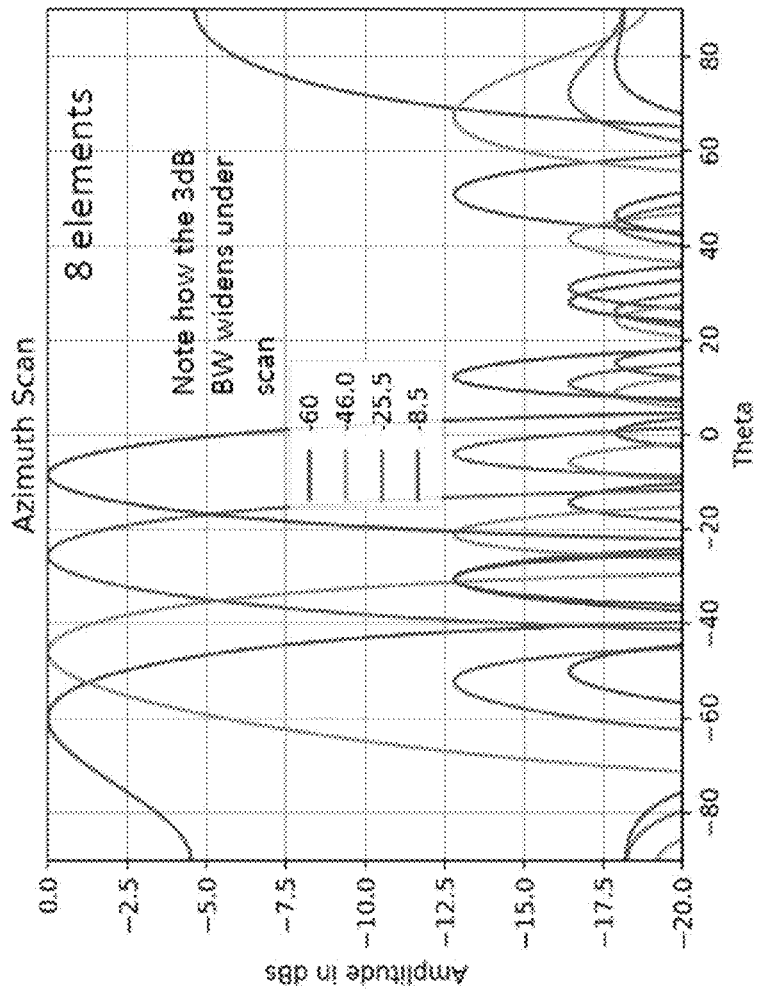
FIG. 9 illustrates the effect of beam distortion at extreme angles for conventional antenna arrays.

FIG. 6 illustrates an exemplary process 600 for performing MIMO using system 400 according to the disclosure. In step 605, radiators 410a-h simultaneously and independently radiate their respective beams 415a-h. As used herein, 'simultaneously and independently' may mean that the beams are not scanned or transmitted at different times in a coordinated manner. The actual signal transmitted on each beam 415a-h may be different or shared among radiators 410a-h.

In step 610, a subset of the radiators 410a-h receives a signal transmitted by UE 120b. In the example scenario illustrated in FIG. 4, radiators 410d and 410e receive the signal at different signal strengths. The other radiators 410a-c and 410f-h may receive no discernable signals from UE 120b. Further to step 610 and the example illustrated in FIG. 4, radiator 410c solely receives a signal transmitted by UE 120a via beam 415c.

In step 615, the signals respectively received by UE 120a and 120b are measured by either RF processor 440 or digital processor 450 to determine if one of the receiving radiators 410d/e (UE 120b) or 410c (UE 120a) is receiving a signal strong enough to have that radiator act solely in establishing a link with the UE. For each UE 120a/b, if the signal received by one radiator is sufficiently strong, then (for that UE) process 600 proceeds to step 625. In the illustrated example, the signal from UE 120a received by radiator 410c is sufficiently strong. However, if none of the received signals is strong enough on its own (e.g., radiators 410d/e receiving the signal from UE 120b), then (for UE 120b) process 600 proceeds to step 620.

Step 615 may be implemented by one or more processors (not shown) associated with either RF processor 440 or digital processor 450. In doing so, the processor(s) may execute machine readable instructions that are encoded within one or more non-transitory memory devices and executed by one or more processors that perform their respective described functions. As used herein, "non-transitory memory" may refer to any tangible storage medium (as opposed to an electromagnetic or optical signal) and refers to the medium itself, and not to a limitation on data storage (e.g., RAM vs. ROM). For example, non-transitory medium may refer to an embedded volatile memory encoded with instructions whereby the memory may have to be re-loaded with the appropriate machine-readable instructions after being power cycled.

In step 625, digital processor 450 executes instructions to designate radiator 410a as the sole communication path with UE 120a. This may be done in a way substantially similar to that done as described above with reference to FIG. 2.

In step 620, digital processor 450 executes instructions to implement beamforming using radiators 410d and 410e. In doing so, the digital processor 450 may employ known beamforming techniques like that described above in reference to FIGS. 1A and 1B. In a variation, more radiators 410 may be used to form beam 420. For example, radiators 410c-f may be employed, but may still be a subset of radiators 410a-h. In this step, the digital processor 450 may measure the received signal strength of each of the subset of radiators, and based on the result of the measuring, may further designate a new subset of radiators 410a-h for beamforming, wherein the new subset of radiators 410a-h have a sufficient received signal strength to properly contribute to a beamforming solution. In doing so, the new subset may be the same as the subset of received signals in step 610, or it may include more or fewer radiators. It will be understood that such variations are possible and within the scope of the disclosure.

Process 600 may be performed by digital processor 450 for each detected UE, in which case digital processor 450 may include one or more processors coupled to a non-transitory memory encoded with instructions to perform process 600. It will be understood that the action of transmitting in step 605 and receiving in step 610 may be performed in part by one or more processors associated with digital processor 450, in conjunction with RF processor 440 and radiators 410a-h. As used herein, "non-transitory memory" may refer to any tangible storage medium (as opposed to an electromagnetic or optical signal) and refers to the medium itself, and not to a limitation on data storage (e.g., RAM vs. ROM). For example, non-transitory medium may refer to an embedded volatile memory encoded with instructions whereby the memory may have to be re-loaded with the appropriate machine-readable instructions after being power cycled. Further, if an action is described herein as being done by a referenced component (e.g., digital processor 450) it will be understood that this implies a processor of the referenced component executing machine-readable instructions to perform the action. All of the steps of process 600 that may be implemented in software may be implemented within a software implementation of a 3GPP LTE or 5G protocol stack. In an example, process 600 may be implemented by software implementing the MAC (Medium Access Control) scheduler function. In doing so, in an LTE eNodeB or 5G gNodeB implementation that employs multiple MIMO layers, it may be possible under the disclosure to use the same set of Resource Elements of each layer's resource grid for different UEs. For example, if system 400 is communicating with two UEs that are angularly spaced such that each has a distinct subset of corresponding radiators 410a-h, then one subset of layers may be dedicated to the first UE and another subset of layers may be dedicated to the second UE, allowing the same set of Resource Elements to be used by the same two UEs.

The system 400/500 of the disclosure offers the following advantages. For example, the quality of each beam 415a-h/510a-h is independent of its orientation, providing even and consistent gain performance for the entire coverage area.

This is in contrast to a conventional linear or planar phased array, whereby beam quality (and thus connection capacity) diminishes with increasing angle off boresight (i.e., as angle increases from a vector normal to the plane of the array). Further, the system 400/500 does not rely on scanning, thereby eliminating a source of latency problems. Also, as described above, given that only a subset of radiators 410a-h may be needed to communicate with a given UE, power reduction may be achieved by only having to activate a subset of radiators (and they associated amplifiers) to communicate with a given UE. Additionally, given that that only a subset of radiators 410a-h may be needed to communicate with a given UE, multiple UEs may share the same Resource Elements in a multi-layer MIMO implementation, providing simultaneous independent beamforming to two UEs using the same spectrum.

Figure 10:
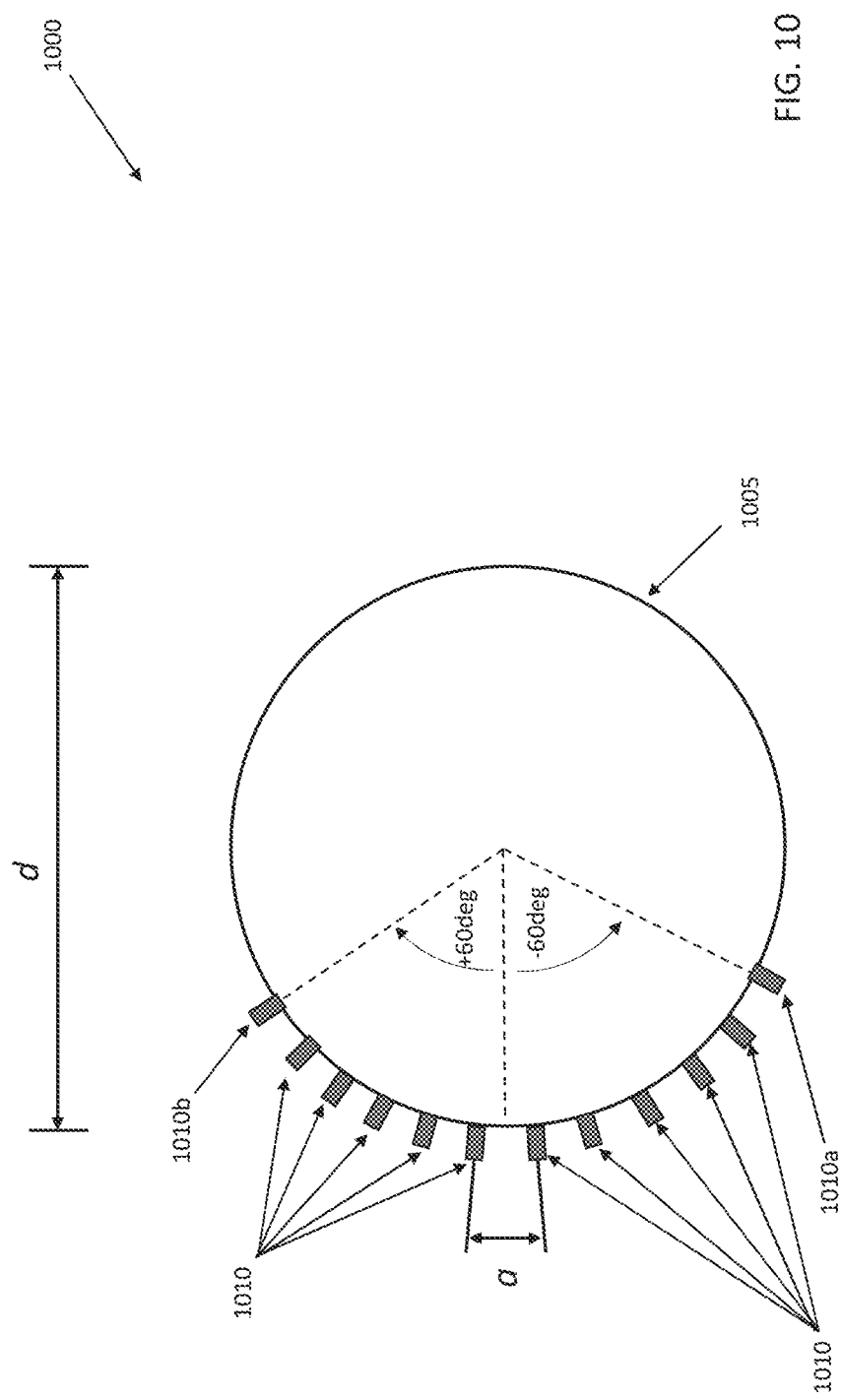
FIG. 10 illustrates an additional exemplary antenna configuration with a plurality of radiators angularly spaced to provide consistent gain throughout the antenna's sector coverage.

FIG. 10 illustrates another exemplary antenna configuration 1000, which has a plurality of radiators 1010 angularly spaced around a gradient index sphere 1005 to provide consistent gain throughout the sector of coverage of antenna 1000. Gradient index sphere 1005 may be similar in construction to gradient index sphere 405 of system 400. The perspective of FIG. 10 is looking along the elevation axis of antenna 1000.

Antenna 1000 has twelve radiators 1010 disposed within its angular range of coverage in azimuth, which in this example is a 120 degree sector. As illustrated in FIG. 10, the perspective viewed along the elevation axis, showing radiators 1010 arrayed in the azimuth plane around the 'equator' of gradient index sphere 1005. Accordingly, the twelve radiators 1010 are evenly spaced along the azimuth plane of antenna 1000. Exemplary antenna 1000 is configured for operation in the C-Band (3700-3980 MHz), and radiators 1010 may be configured to radiate a beam (not shown) with a 10 degree beamwidth. In an exemplary embodiment of antenna 1000, gradient index sphere 1005 may have a diameter (d) of 550 mm, and may have disposed on it C-Band radiators 1010 that are placed at a regular angular spacing (a) of 10 degrees, which corresponds to a physical spacing of 48 mm along the surface of gradient index sphere 1005. As illustrated, the two radiators 1010 at the ends are designated end radiators 1010a and 1010b. End radiator 1010a is disposed at −60 degrees of azimuth, and end radiator 1010b is disposed at +60 degrees azimuth, forming the beams at the cell edges of a 120 degree sector.

As with radiators 410a-h of system 400, the radiators 1010 of antenna 1000 may each have two radiators that are oriented to radiate in two orthogonal polarizations (e.g., +/−45 degrees).

Although not shown, antenna 1000 may be integrated into system 400 whereby each of the radiators 1010 is coupled to RF processor 440, digital processor 450, and core network 460 as illustrated in FIG. 4.

Figure 11:
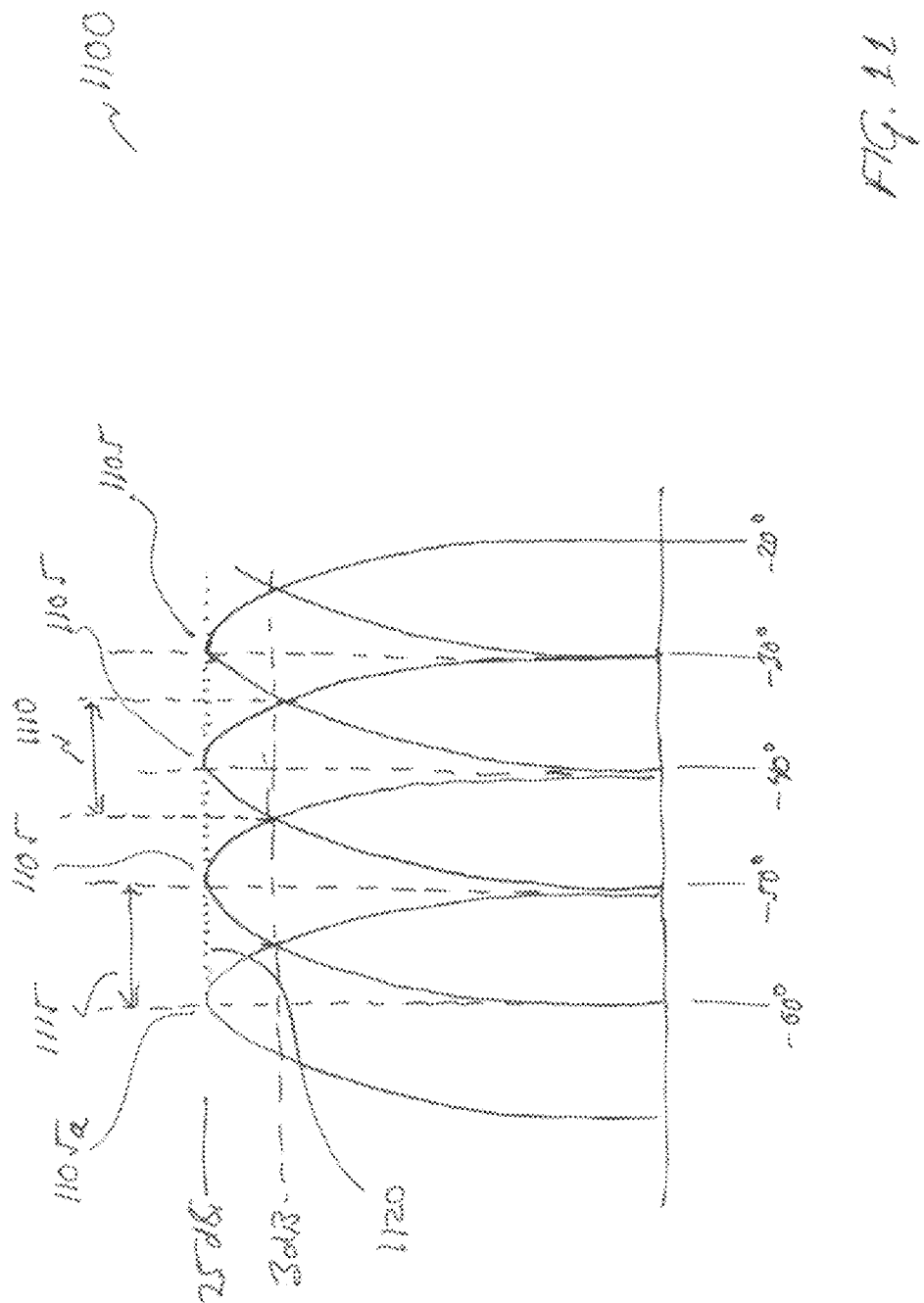
FIG. 11 illustrates beam overlap and resulting summed gain across adjacent beams. generated by radiators having 10 degree angular spacing using the antenna of FIG. 10.

FIG. 11 illustrates a partial beam pattern plot 1100 corresponding to antenna 1000. In plot 1100, the x-axis is the angular orientation of a subset of radiators 1010 (and their corresponding beams) as disposed on gradient index sphere 1005. Referring to FIGS. 11 and 10, beam 1105a, which is oriented (i.e., has an azimuth boresight) at −60 degrees azimuth, corresponds to end radiator 1010a in FIG. 10. Adjacent beam 1105 corresponds to the radiator 1010 that is adjacent to end radiator 1010a and has an azimuth boresight of −50 degrees. As illustrated, the next adjacent beam is at −40 degree of azimuth and corresponds to the next radiator 1010, etc. Each of the beams 1105 has a 10 degree angular separation (ref 1115), a 10 degree beamwidth, and a peak gain of 25 dBi (25 dBi being typical of current competing technologies but not restricted in this implementation for future requirements) at boresight (−60 degrees for beam 1105a and −50 degrees for adjacent beam 1105). Accordingly, the beams intersect at their respective 3 dB points in their gain profiles. Accordingly, if two adjacent beams (e.g., 1105a at −60 degrees and 1105 at −50 degrees) are transmitting the same signal, the gains of the two beams 1105/1050 sum such that beam 1105a dominates at −60 degrees azimuth. As azimuth shifts from −60 degrees (to the right along the x-axis), the gain of beam 1105a falls off as the gain of adjacent beam 1105 increases. This summation, depicted by summation line 1120, continues until the azimuth reaches −50 degrees, where adjacent beam 1105 dominates. Throughout this azimuth translation, the sum 1120 in gain of beams 1105a and 1105 remains constant at 25 dBi.

An advantage of the arrangement in antenna 1000 is that the gain remains consistent throughout the sector right up to the cell edges at +/−60 degrees. This may be accomplished by having the resources (time and frequency) for a given UE shared between two radiators 1010 (and thus corresponding adjacent beams 1105) while making those resources available to a UE that is within the sector coverage of antenna 1000 but in a different set of adjacent beams 1105.

Variations to antenna 1000 are possible. For example, antenna 1000 may be designed to use a different frequency band than C-Band. In this case, the diameter d of gradient index sphere 1105 may scale accordingly and the radiators 1010 may have a different specific configuration to operate in the different frequency band. However, the ten degree spacing and ten degree beamwidth may still be used to provide consistent gain across the sector of antenna 1000 right to the cell edge. It will be understood that such variations are possible and within the scope of the disclosure.

What is claimed is:

1. An antenna for use in a Massive MIMO (Multiple Input Multiple Output), comprising:
    a gradient index sphere having a diameter; and
    a plurality of radiators disposed on the gradient index sphere along an azimuthal plane and at an angular spacing, each of the plurality of radiators having a corresponding beamwidth,
    wherein the diameter and the angular spacing are configured whereby the corresponding beamwidth of each of the plurality of radiators is substantially uniform and whereby the corresponding beamwidth is substantially equal to the angular spacing, wherein the diameter is 500 mm, and the angular spacing is 10 degrees, and wherein each of the plurality of radiators is configured to radiate in a C-Band.

2. A method for establishing a link between a base station and a UE (User Equipment), the base station comprising the antenna of claim 1, each of the plurality of radiators configured to generate a unique beam having a corresponding unique boresight, the method comprising:
    simultaneously transmitting a downlink signal on each beam;
    simultaneously receiving, by a subset of radiators, an uplink signal transmitted by the UE; and
    implementing beamforming to generate a UE-specific beam using only the subset of radiators.

3. A method for establishing a link between a base station and a UE (User Equipment), the base station comprising the antenna of claim 1, each of the plurality of radiators configured to generate a unique beam having a corresponding unique boresight, the method comprising:

simultaneously transmitting a downlink signal on each beam;

simultaneously receiving, by a subset of radiators, an uplink signal transmitted by the UE;

measuring a signal strength corresponding to each received uplink signal;

designating a second subset of radiators based on their measured signal strength; and implementing beamforming to generate a UE-specific beam using only the second subset of radiators.

4. The antenna of claim 1, wherein each of the plurality of radiators comprises two radiators configured to transmit in orthogonal polarizations.

5. The antenna of claim 1, wherein the plurality of radiators comprises twelve radiators.

6. The antenna of claim 1, wherein the plurality of radiators comprises twelve radiators.

7. The antenna of claim 6, wherein the plurality of radiators comprises a first end radiator and a second end radiator, and wherein the first end radiator and the second end radiator each have an azimuth angle corresponding to an edge of an antenna sector.

8. The antenna of claim 7, wherein the first end radiator comprises a −60 degree azimuth orientation and the second end radiator comprises a +60 degree azimuth orientation.

9. An antenna for use in a Massive MIMO (Multiple Input Multiple Output), comprising:

a gradient index sphere having a diameter; and a plurality of radiators disposed on the gradient index sphere along an azimuthal plane and at an angular spacing, each of the plurality of radiators having a corresponding beamwidth, wherein the diameter and the angular spacing are configured whereby the corresponding beamwidth of each of the plurality of radiators is substantially uniform and whereby the corresponding beamwidth is substantially equal to the angular spacing, wherein the plurality of radiators comprises a first end radiator and a second end radiator, and wherein the first end radiator and the second end radiator each has an azimuth angle corresponding to an edge of an antenna sector.

10. The antenna of claim 9, wherein the first end radiator comprises a −60 degree azimuth orientation and the second end radiator comprises a +60 degree azimuth orientation.

11. The antenna of claim 9, wherein the diameter is 550 mm, and the angular spacing is 10 degrees.

12. The antenna of claim 11, wherein each of the plurality of radiators is configured to radiate in a C-Band.

* * * * *